No. 790,798. PATENTED MAY 23, 1905.
A. A. LYTLE.
SEAT HINGE.
APPLICATION FILED JUNE 6, 1904.

WITNESSES
A. T. Palmer
H. M. Kelso.

INVENTOR
Alton A. Lytle
by Richard P. Elliott
Attorney.

No. 790,798. Patented May 23, 1905.

UNITED STATES PATENT OFFICE.

ALTON A. LYTLE, OF GRAND RAPIDS, MICHIGAN.

SEAT-HINGE.

SPECIFICATION forming part of Letters Patent No. 790,798, dated May 23, 1905.

Application filed June 6, 1904. Serial No. 211,297.

*To all whom it may concern:*

Be it known that I, ALTON A. LYTLE, a citizen of the United States, residing at Grand Rapids, county of Kent, and State of Michigan, have invented certain new and useful Improvements in Seat-Hinges, of which the following is a specification, reference being had to the drawings accompanying the same.

My invention relates to that class of seat-hinges wherein the seat supported thereon is arranged to fold out of the way of the sitter.

The object of my invention is to so construct a seat-hinge that it shall be simple, durable, and have the least friction possible between the moving members.

Another object of my invention is to provide a single-point bearing which will be automatic in its adjustment.

A further object of my invention is to so pivot a movable member upon the fixed member that said movable member will adjust itself sidewise to adapt itself to the line of movement of the seat.

Figure 1:
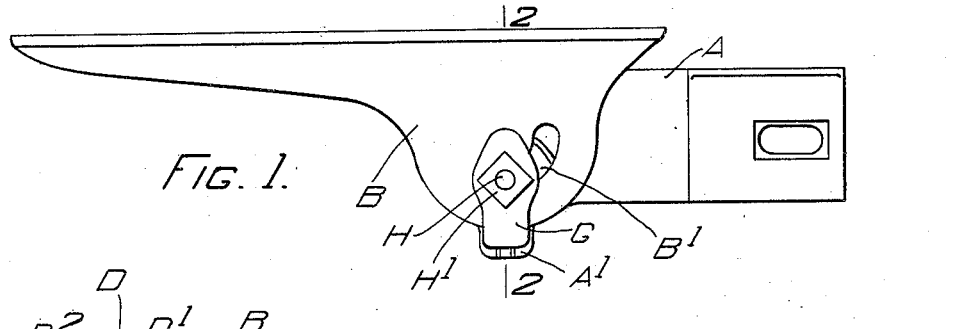
Figure 2:
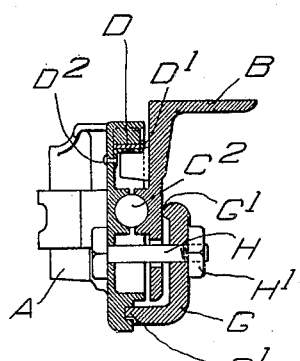
Figure 3:
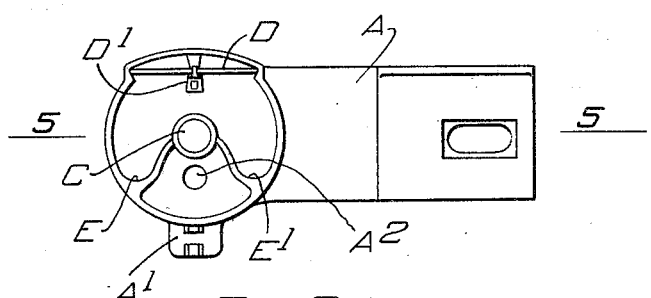
Figure 4:
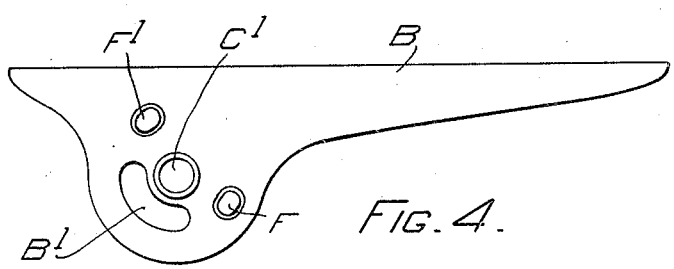
Figure 5:
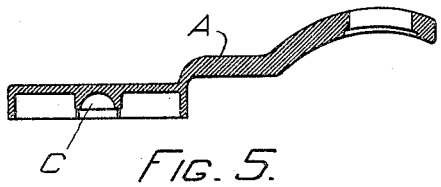

In the drawings accompanying this specification and forming a part thereof, Figure 1 represents a side elevation of the different parts of a seat-hinge embodying my invention assembled. Fig. 2 is a sectional end elevation through line 2 2, Fig. 1. Fig. 3 is an elevation of the supporting member of my seat-hinge, showing the inside arrangement of the hinge portion. Fig. 4 is a side elevation of the supported member, showing the pivot-point and stops. Fig. 5 is a sectional elevation of the supporting member through line 5 5, Fig. 3.

In the drawings, A represents the bracket or supporting member of my seat-hinge, one end of which may be provided with a curved surface and a slotted hole to adjustably attach it to any suitable support at the proper height for a seat, or it may be integral with the support, the other end having suitable means upon which the supported member may be pivoted.

B is the supported member, to which may be attached a seat. The supporting member A is provided with a cup-shaped recess C, adapted to receive the ball $C^2$ of suitable size to form a pivot-point between the two members A and B.

D is a flat spring secured in a recess in the supporting member by means of a small clip D', bent around it and attached to the supporting member by the rivet $D^2$.

E and E' are shoulder portions adapted to act as stops to limit the movement of the supported member B.

The supported member B has cast on its inner surface the cup-shaped bearing C' of the same diameter and curvature as the cup C and adapted to receive the same size ball as can be inserted in said cup-shaped bearing C.

F and F' are projections which are adapted to contact with the shoulders or stops E and E' to limit the movement of the supported member B in both directions. When the stop F' is in contact with the stop or shoulder E', the stop F contacts with one end of the spring D.

G is a clamping-bracket arranged to hold the supported member B in place upon the pivot-ball $C^2$ by the contact of the point G' with the outside wall of said supported member B. The lower end of the bracket G has a projecting portion G', which fits in a recess in the downwardly-projecting portion A'. The bracket G is held in place by the bolt H, which passes through a hole in same, the slot B' in the supported member, and the hole $A^2$ in the supporting member and is screw-threaded upon its outer end to receive the nut H'.

Instead of a ball, as $C^2$, for the pivot a spherical projection may be formed upon the supporting member A, of such size and shape as to fit in the cup portion C to form a pivot upon which said supported member B may be mounted. It will be readily understood from the sectional elevation, Fig. 2, that the pivot $C^2$ may be readily removed and a new one put in its place when worn through the rubbing contact of the cups. The small contact-surface at the pivot-points renders the friction between the supporting members tending to retard the movement of one upon the other very slight. The method of pivoting the parts permits the bracket or supported member B to rock laterally slightly in both directions to adjust it to any slight inequalities of the seat to which it is attached.

The purpose of the spring D is as follows: When the supported member is revolved upon the pivot-ball $C^2$, one or the other of the stops F or F' contacts with either end of the spring D, as the case may be, before the other of said stops comes in contact with either of the stop-shoulders E or E'. This initial contact of the stop with the spring D gives a slight yielding contact, which obviates the noise that would take place did the solid stops E or E' contact directly with the stops F or F'.

The form of the seat-brackets or supporting and supported members and pivot-points may be changed without departing from the spirit of my invention.

What I claim is—

1. A hinge-joint, comprising a supporting member, and a supported member, each provided with a cup-shaped bearing; a clamping member non-axial with said supporting and supported members; and a spherical pivot-point interposed between the supporting and the supported members.

2. A hinge-joint, comprising a supporting member having a cup-shaped bearing; a supported member having a cup-shaped bearing, and a clamping member non-axial with said supporting and supported members; a spherical pivot-point interposed between the supporting and supported members; and means for limiting the rotative movement of the supported member.

3. A hinge-joint, comprising a supporting member and a supported member; cup-shaped bearings in said supporting and supported members; a non-axial clamping member; and a single spherical pivot-point interposed in said cup-shaped bearings between the supporting and supported members, said parts arranged to permit a rotary movement of the supported member, and a universal sidewise adjustment of same.

4. A hinge-joint made up of a supporting member and a supported member, each provided with a cup-shaped bearing; a single pivot-point interposed in said cup-shaped bearings, adapted to permit a rotary movement of the supported member, and a universal sidewise adjustment of same; fixed stops to limit the movement of the supported member; and a spring-stop to form a cushion at the ends of the movement of the supported member.

5. A hinge-joint made up of a supporting member and a supported member, each provided with a cup-shaped bearing; a single pivot-point interposed between said members in said cup-shaped bearings, adapted to permit a rotary movement to the supported member and a universal sidewise adjustment of same; a non-axial clamping member adapted to contact with and support the supported member; fixed stops to limit the movement of the supported member; and a spring-stop to form a cushion at the ends of the movement of said supported member.

In testimony whereof I have hereunto set my hand, in the presence of two subscribing witnesses, this the 25th day of April, 1904.

ALTON A. LYTLE.

Witnesses:
GEO. W. BOWEN,
H. S. WATROUS.